United States Patent [19]

Schüfer

[11] Patent Number: 4,679,817
[45] Date of Patent: Jul. 14, 1987

[54] FOLDING HAND TRUCK

[75] Inventor: Dieter Schüfer, Nassau/Lahn, Fed. Rep. of Germany

[73] Assignee: Leifheit AG, Nassau/Lahn, Fed. Rep. of Germany

[21] Appl. No.: 838,900

[22] Filed: Mar. 12, 1986

Related U.S. Application Data

[63] Continuation of Ser. No. 606,448, May 3, 1984, abandoned.

[30] Foreign Application Priority Data

May 11, 1983 [EP] European Pat. Off. ........ 83104657.8

[51] Int. Cl.⁴ .............................................. B62B 1/12
[52] U.S. Cl. .................................... 280/655; 280/47.27
[58] Field of Search ............. 280/655, 47.29, 47.37 R; 16/115

[56] References Cited

U.S. PATENT DOCUMENTS

| | | | |
|---|---|---|---|
| 2,490,189 | 12/1949 | Alexander | 280/655 |
| 3,177,000 | 4/1965 | Alexander | 280/655 |
| 3,222,095 | 12/1965 | Gerus | 16/115 |
| 3,266,144 | 8/1966 | Fishlove | 16/115 |
| 3,275,336 | 9/1966 | Warner | 16/115 |
| 3,284,103 | 11/1966 | Polzin | 16/115 |
| 4,275,894 | 6/1981 | Mortenson | 280/47.29 |
| 4,407,521 | 10/1983 | Zeitlin | 280/655 |
| 4,478,429 | 10/1984 | Adams | 280/655 |

Primary Examiner—David M. Mitchell
Assistant Examiner—Eric D. Culbreth
Attorney, Agent, or Firm—Frishauf, Holtz, Goodman & Woodward

[57] ABSTRACT

A folding hand truck with a four-part handle shaft 1, in which a bottom part 6 and a central part 8 are connected by an articulation 7, while a locking part 9, to which a handle part 11 is articulated by a multiple articulation 10 is guided telescopically in these two parts, so that in the telescoped state of the handle part the multiple articulation assumes a position above the articulation (FIG. 1).

9 Claims, 13 Drawing Figures

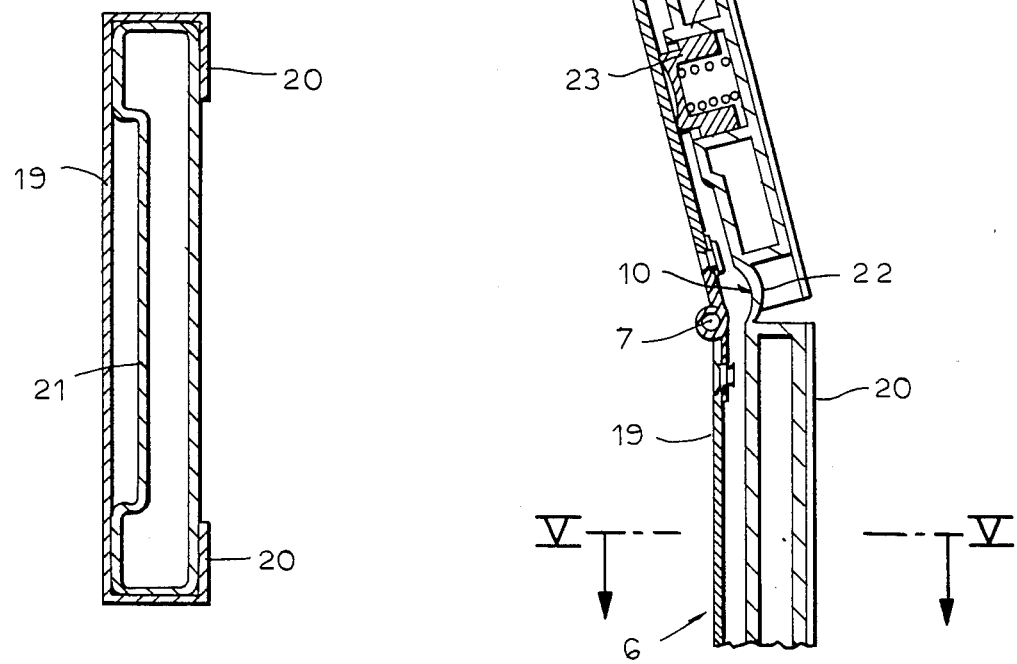
FIG. 4
FIG. 5

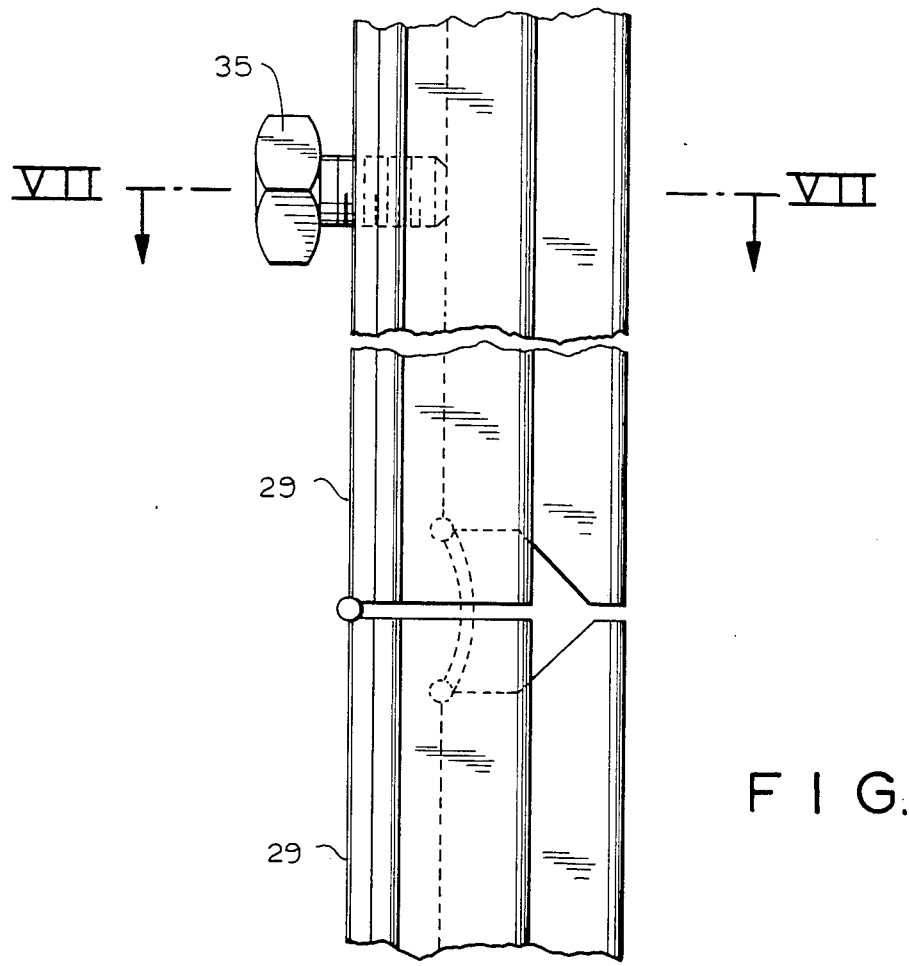
F I G. 6
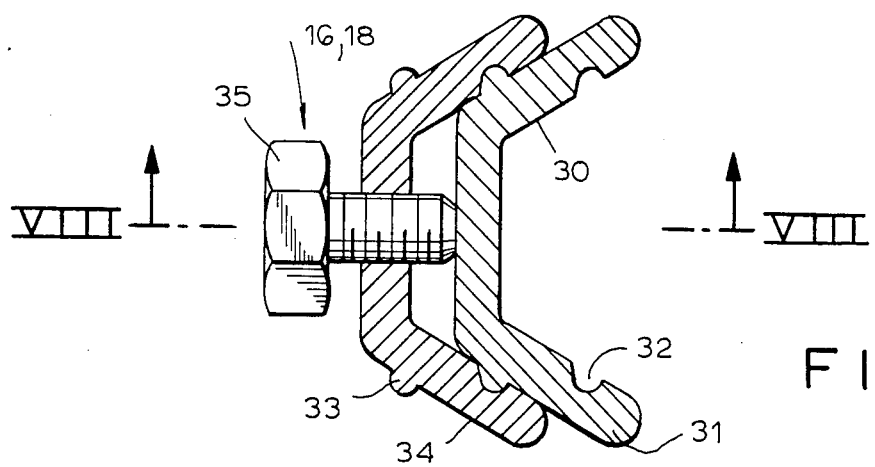
F I G. 7

FOLDING HAND TRUCK

This application is a continuation of application Ser. No. 606,448, filed May 3, 1984 and now abandonned.

BACKGROUND

The invention relates to a folding hand truck having a bottom carrier plate articulated to an upright handle portion.

Hand trucks of this type, such as have become known from German Utility Design 78 09,844 for example, are used particularly in the domestic field. They serve on the one hand as carriers for heavy baggage items; on the other hand, when provided with a container they are used for shopping. In order to ensure versatile usefulness, it is convenient to construct them collapsible. In this respect the handle shaft is always the special problem. Whereas the carrier part can be constructed to fold in a relatively simple manner, it is necessary for the handle shaft to be divided at least doubly in order to conform to the order of magnitude of the support part. In the known appliances this occurs by a multiple telescope. Because a device of this type is really only practical if it can also be operated really rapidly and simply, these telescopes are of a highly complicated design. In order to prevent rattling and wobbling, they have to be produced to close tolerances. This inevitably results not only in difficult assembly, but also high material costs due to high precision profiles.

THE INVENTION

The aim of the invention is to produce a device on a hand truck which makes it possible to fold the latter together virtually in one movement, whilst simple assembly with a few components must be possible, without the need to use profiles with unduly close tolerances.

Briefly, this aim is achieved according to the invention by providing a locking part which telescopes past an articulation between two other parts. Due to the combination of two folding parts with a telescopable locking part, to which the handle part is articulated, no unlocking parts to be activated by another part are necessary in the handle shaft. Only a preliminary unlocking of the handle part is necessary at the commencement of the folding process. The number of components is therefore reduced considerably. The arrangement of the articulation on the side remote from the load to be transported produces a tight mutual abutment of the components, so that no disturbing rattling noises occur even when a wide tolerance range is chosen. The assembly is simple and foolproof due to the reduction of the components and particularly the elimination of small parts.

Further features of the invention include various types of articulations, and spar configurations. Thus the multiple articulation may be constructed in different ways depending upon required load capacity and design preferences. Both the material and shape of the individual handle shaft parts also play a part in this. Thus the multiple articulation may be formed by a helical spring or leaf spring in the simplest manner. The construction of the multiple articulation as a hinge strip or as a double lever achieves a visual improvement.

The construction of the multiple articulation as a film hinge represents a particularly visually attractive solution. In this case the locking part and the handle part may be constructed integrally. Another consequence is particularly simple assembly.

Some exemplary embodiments of the invention are explained more fully below with reference to the drawings, wherein:

FIG. 4 shows a detail solution in a detail according to IV from FIG. 2,

FIG. 5 shows a section along the line V—V in FIG. 4,

FIG. 6 shows a further alternative solution of a handle shaft as a detail,

FIG. 7 shows a section along the line VII—VII in FIG. 6,

Figure 1:
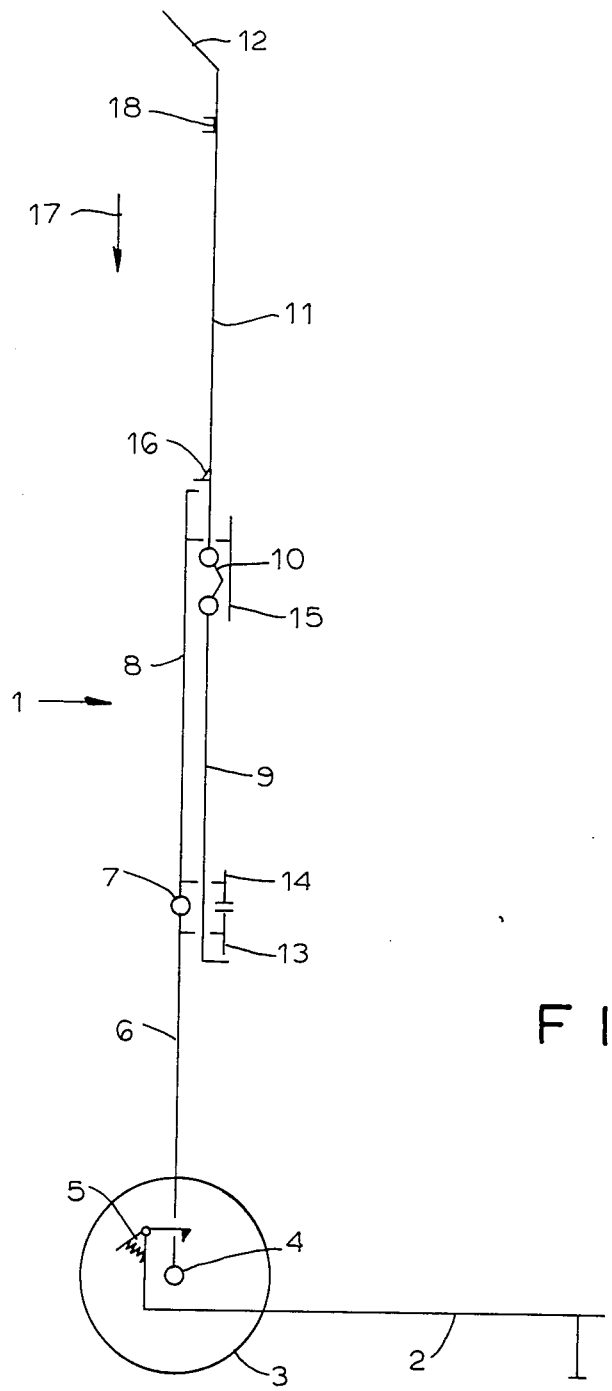
FIGS. 1 to 3 show diagrammatically a hand truck in the transport position, at the moment of folding and folded in FIG. 3.

FIG. 1 shows, very diagrammatically, a hand truck in side elevation. It consists substantially of a multi-part handle shaft 1, a carrier part 2 and wheels 3, which are attached to an axle 4. The axle 4 also serves as a pivot axis for the carrier part 2 in the present example.

5 designates a symbolically illustrated anchorage means between the carrier part 2 and the handle shaft 1.

The multi-part handle shaft 1 is composed of a bottom part 6, which is connected by an articulation 7 to a central part 8, and a locking part 9, to which a handle part 11 is articulated by a multiple articulation 10. The handle part 11 ends in a handle 12. Locking part 9 and handle part 11 are guided in the bottom part 6 and central part 8. These guide means are again illustrated diagrammatically and designated by the reference numerals 13 to 15. The guide means 13, 14 lock the articulation 7, whereas the guide means 15 locks the multiple articulation 10.

Figure 2:
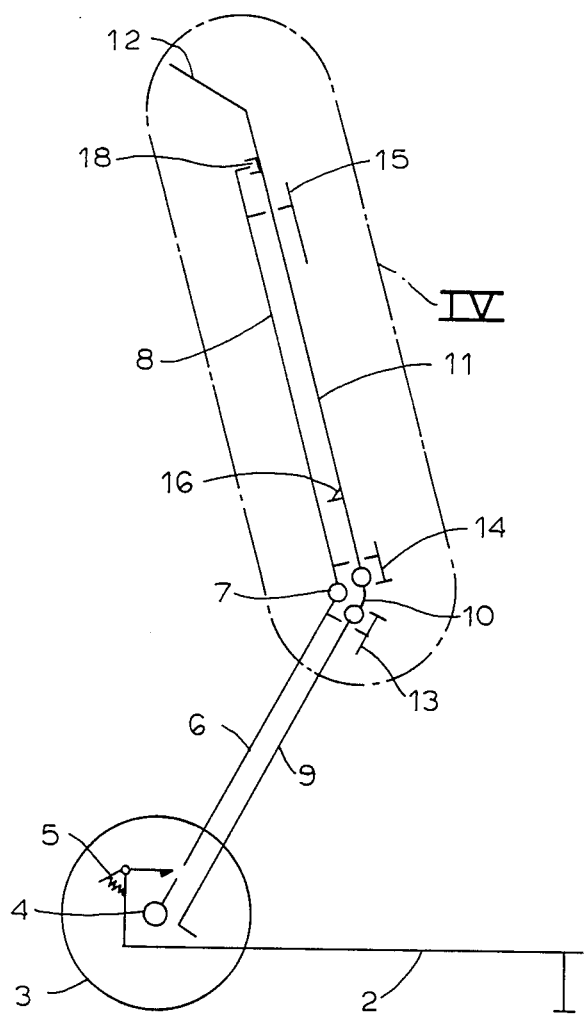
Figure 3:
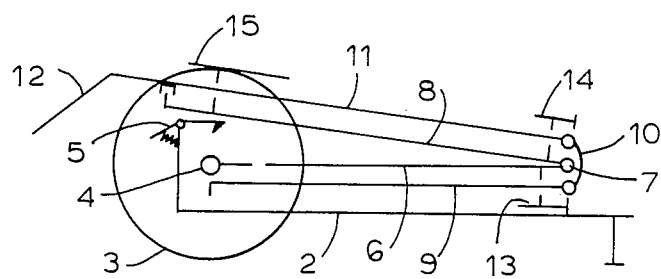
Figure 8:
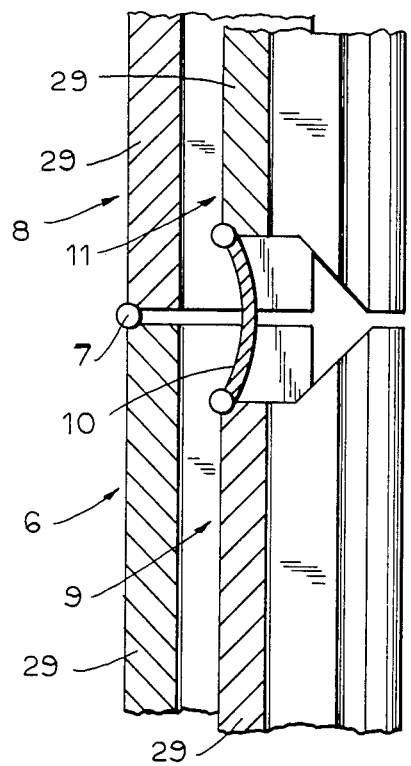
FIG. 8 shows a sectin along the line VIII—VIII in FIG. 7.

If it is now required to transfer the hand truck from the service position aocording to FIG. 1 into the storage position according to FIG. 3, the handle part 11 is moved in the direction 17, after releasing or, as the case may be, overcoming a catch 16, until the multiple articulation 10 assumes a position above the articulation 7. As FIG. 2 clearly shows, the folding process into the position according to FIG. 3 is then possible after releasing the anchorage means 5. The handle part may optionally be secured in this position by a further catch 18.

Whereas the invention is illustrated diagrammatically in FIGS. 1 to 3, FIGS. 4 to 13 show a selection of possible spatial variants. The same reference numerals are used here for equivalent components as in the diagrammatic drawings in FIGS. 1 to 3.

In the exemplary embodiment according to FIG. 4, a view corresponding to FIG. 2 has been chosen, the bottom part 6 and the central part 8 are constructed as a square profile 19 open on one side. It is provided with two guide cheeks 20, which form the guide means for the locking and handle parts 9, 10, 11, which are constructed as a blow moulding 21. The locking part 9 and the handle part 11 are connected integrally together by a film hinge 22 forming the multiple articulation. The catch 16 is formed by a spring loaded push-button 23, which is guided in a sleeve 24 in the handle part 11, and by an engaging sleeve 25 with entry ramp 26 in the end region 27 of the central part 8. A stop 28 is provided on the engaging sleeve for the sleeve 24 in order to absorb major axial forces, particularly when towing the hand truck across curbstones.

A further alternative solution of the choice of profile is shown in FIGS. 6 to 8 and 9, in which circumferentially open profile parts 29 of identical cross-section are employed for the individual handle shaft parts. The profile parts 29 have, on the inside 30 of the shoulders 31, recesses 32 extending in the longitudinal direction, in which projections 33 on the outside 34 engage. The catches 16 and/or 18 are formed by a clamp screw 35 in this exemplary embodiment.

Figure 9:
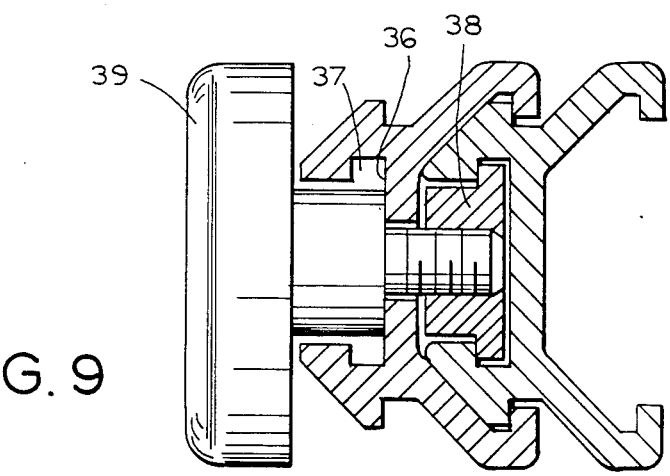
FIG. 9 shows a further profile variant with a blocking element.

FIG. 9 shows a similar profile in principle. Here the rear side 36 is enlarged to such an extent that a tee-groove 37 extending in the longitudinal direction is formed. A slider 38, which is arranged slidably in this tee-groove 37 as a catch, is loaded by a tensioning screw 39.

Figure 10:
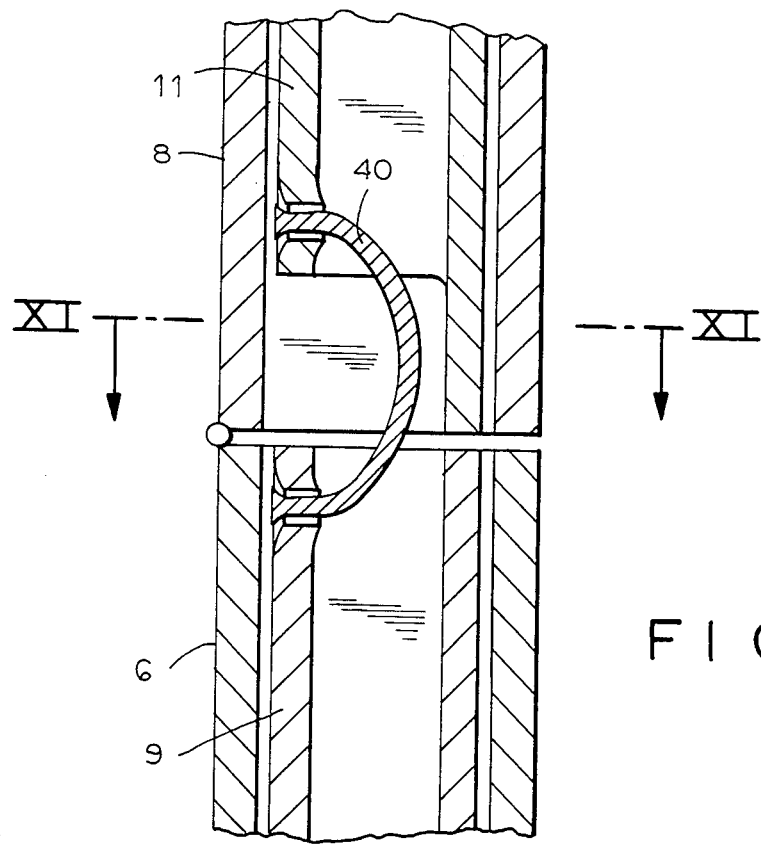
FIG. 10 shows a construction of a handle shaft employing square tubes.
Figure 11:
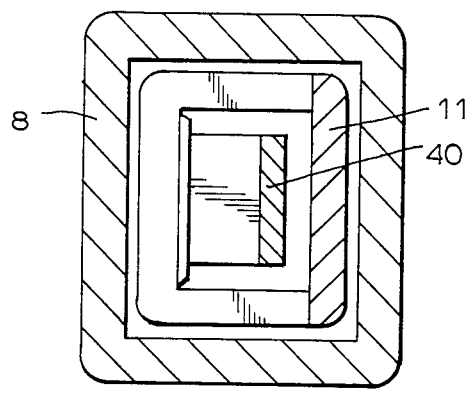
FIG. 11 shows a section along the line XI—XI in FIG. 10.

FIGS. 10 and 11 show a profile construction in the form of square tubes. The multiple articulation 10 in this exemplary embodiment is formed by a leaf spring 40.

Figure 12:
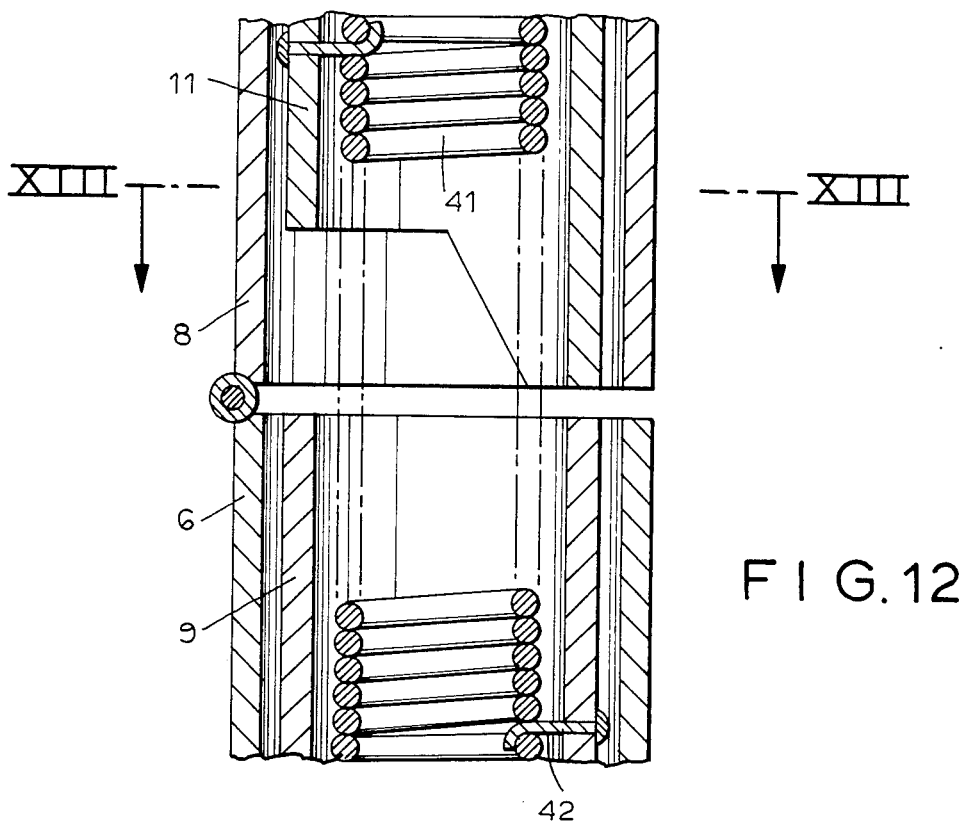
FIG. 12 shows a handle shaft construction with round tubes.
Figure 13:
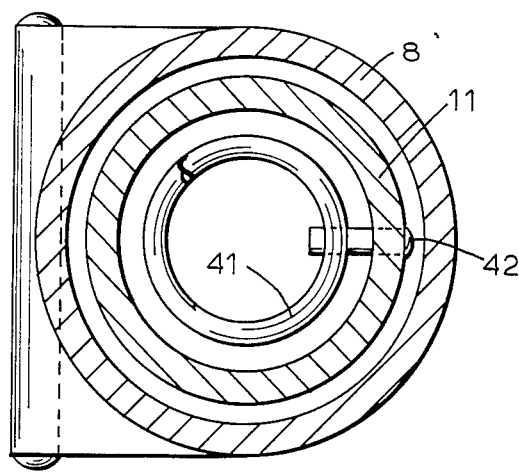
FIG. 13 shows a section along the line XIII—XIII in FIG. 12.

Lastly, FIGS. 12 and 13 show an embodiment employing round tubes. The multiple articulation 10 in this variant is formed by a helicoidal spring 41, which is secured in the inner tubes by appropriate elements 42.

I claim:

1. A simplified hand truck having a wheeled horizontal carrier part (2) foldably connected to a collapsible upright handle portion (1)

wherein, in accordance with the invention, said upright handle portion (1) comprises two pairs of interarticulated, generally rectangular, planar frame sections, one (6, 8) of said pairs being stationary with respect to the wheels and the other (9, 11) of said pairs being slidable, within guide means (13, 14) provided on the stationary one (6, 8) of said pairs, between a retracted position and an extended position;

each of said pairs being internally hinged along adjacent edges of said frame sections by a respective hinge means (7, 10) to permit the frame sections defining a pair to rotate with respect to each other, with the four frame sections being so dimensioned that said two hing means (7, 10) are aligned with each other when said slidable pair (9, 11) is in said retracted position, thereby permitting collapse of said upright handle portion (1) by a single folding operation;

said slidable pair (9, 11), when in its extended position, locking the hinge means (7) of said stationary pair against relative rotation of the frame sections (6, 8) thereof, said two hinge means (7, 10) then being out of alignment with each other; and the overall length of said upright handle portion (1) being less when said slidable (9, 11) section pair is retracted than when said slidable pair is extended and serving as a locking element.

2. A folding hand truck as claimed in claim 1, wherein the hinge means (10) of said slidable pair (9, 11) is a spring (40, 41).

3. A folding hand truck as claimed in claim 1, wherein the hinge means (10) of said slidable pair (9, 11) is a hinge strip.

4. A folding hand truck as claimed in claim 1, wherein the hinge means (10) of said slidable pair (9, 11) is a film hinge.

5. The simplified hand truck of claim 1, wherein each of the parts (6, 8) of said stationary pair has two ends, one of which ends is connected to said hinge means (7) of said stationary pair intermediate said parts (6, 8); and a respective guide means (13, 14) is disposed on the end of each of said parts (6, 8) adjacent to said hinge means (7) of said stationary pair and closely surrounds a part (9) of said slidable pair in its extended position and thereby assists in locking said hinge means (7) of said stationary pair.

6. The simplified hand truck of claim 1, wherein a guide means (15) is provided on the end of said stationary pair (6, 8) remote from the connection to said carrier part (2) and locks the hinge means (10) of said slidable pair against relative rotation of the parts (9, 11) of said slidable pair.

7. The simplified hand truck of claim 1, wherein said hinge means (10), of said slidable pair, is sufficiently wide to permit said slidable pair (9, 11) to be folded around said other, stationary, pair (6, 8), with the parts of said slidable pair slightly spaced from each other.

8. The simplified hand truck of claim 1, wherein each of parts (6, 8) of said stationary pair has two ends, one of which ends is connected to said hinge means (7) of said stationary pair intermediate said parts (6, 8);

a respective guide means (13, 14) is disposed on the end of each of said parts (6, 8) adjacent to said hinge means (7) of said stationary pair and closely surrounds a part (9) of said slidable pair in its extended position and thereby assists in locking said hinge means (7) of said stationary pair; and a guide means (15) is provided on the end of said stationary pair (6, 8), remote from the connection to said carrier part (2) and locks the hinge means (10) of said slidable pair against relative rotation of the parts (9, 11) of said slidable pair.

9. A folding hand truck comprising:

a carrier part (2) provided with wheels (3);

at least one multi-part handle shaft (1) having a bottom part (6),
a central part (8),
a locking part (9), and
a handle part (11) having a top end provided with a handle (12), said carrier part (2) being foldably connected to said bottom part (6);

first articulation means (7), connecting the bottom part (6) with the central part (8);

second articulation means (10), connecting said handle part (11) with said locking part (9), which locking part is slidably guided telescopically in said bottom (6) and said central (8) parts;

so that when said locking part (9) is positioned within both said bottom (6) and central (8) parts, the second articulation means (10) assumes a position higher than the first articulation means (7);

wherein (FIG. 7) p1 the bottom part (6), the central part (8), the locking part (9) and the handle part (11) have identical cross-sections and comprise open profile parts (28), each having shoulders (31), which shoulders are formed with recesses (32) extending longitudianally along an inside surface (30) of said open profile part (29) and with projections (33), corresponding to and adapted to engage the recesses (32) of another open profile part, on an outside (34) surface of said part.

* * * * *